United States Patent
Dietz et al.

(10) Patent No.: US 8,250,954 B2
(45) Date of Patent: Aug. 28, 2012

(54) BAND SAW AND METHOD OF SPATIALLY POSITIONING A BAND SAW BLADE

(75) Inventors: Hans Dietz, Ammerbuch (DE); Jean Gunnar Bergvall, Altoetting (DE)

(73) Assignee: Esterer WD GmbH, Reutlingen (DE)

( * ) Notice: Subject to any disclaimer, the term of this patent is extended or adjusted under 35 U.S.C. 154(b) by 87 days.

(21) Appl. No.: 12/274,751

(22) Filed: Nov. 20, 2008

(65) Prior Publication Data

US 2009/0126549 A1    May 21, 2009

Related U.S. Application Data (63) Continuation of application No. PCT/EP2007/004474, filed on May 19, 2007.

(30) Foreign Application Priority Data

May 22, 2006  (DE) .................. 10 2006 024 646
Jan. 23, 2007  (DE) .................. 10 2007 005 581

(51) Int. Cl.
*B27B 13/00* (2006.01)
(52) U.S. Cl. .............................. 83/13; 83/817
(58) Field of Classification Search ................ 83/13, 56, 83/788–793, 814–820
See application file for complete search history.

(56) References Cited

U.S. PATENT DOCUMENTS

| | | | |
|---|---|---|---|
| 3,318,347 A | 5/1967 | Alich | |
| 4,030,386 A * | 6/1977 | Poetzsch et al. | 83/871 |
| 4,085,636 A | 4/1978 | Eklund | |
| 4,127,045 A * | 11/1978 | Blucher et al. | 83/796 |
| 4,195,543 A * | 4/1980 | Tapply et al. | 83/794 |
| 4,237,757 A * | 12/1980 | Bonac | 83/74 |
| 4,257,301 A * | 3/1981 | Tuomaala | 83/835 |
| 2006/0144202 A1* | 7/2006 | Tokiwa et al. | 83/74 |

FOREIGN PATENT DOCUMENTS

| | | |
|---|---|---|
| DE | 196 53 242 A1 | 6/1998 |
| DE | 199 01 715 C1 | 9/2000 |
| DE | 201 05 845 U1 | 9/2002 |
| JP | 61-047644 * | 3/1986 |
| SE | 436 849 | 1/1985 |
| WO | WO 00/47378 | 8/2000 |

\* cited by examiner

*Primary Examiner* — Phong Nguyen
(74) *Attorney, Agent, or Firm* — Harness, Dickey & Pierce, P.L.C.

(57) ABSTRACT

A band saw, a band saw assembly, and a method of spatially positioning a band saw blade are suggested. The band saw comprises a band saw blade against which a sawing material is adapted to be guided in a feed direction. A guide for the band saw blade has at least one magnet exerting a force on the band saw blade determining the spatial position thereof. The at least one magnet is adjustable in its force effect and the force is directed transversely to the feed direction. The guide, as viewed in the feed direction of the sawing material, has a front magnet and a rear magnet, the magnets facing a front area and a rear area, respectively, of the band saw blade. A method of spatially positioning a band saw blade is executed while a sawing material is guided against the band saw blade in a feed direction. A magnet force is exerted on the band saw blade. The magnet force, and thereby the position of the band saw blade is adjusted transversely to the feed direction. The magnet force, as viewed in the feed direction of the sawing material, is exerted on a front area and on a rear area of the band saw blade.

24 Claims, 5 Drawing Sheets

BAND SAW AND METHOD OF SPATIALLY POSITIONING A BAND SAW BLADE

FIELD OF THE INVENTION

The invention is related to the field of band saws and methods for positioning a band saw blade.

More specifically, the invention is related to a band saw comprising a band saw blade against which a sawing material is adapted to be guided in a feed direction, and a guide for the band saw blade, the guide having at least one magnet exerting a force on the band saw blade determining the spatial position thereof, the at least one magnet being, further adjustable in its force effect and the force being directed transversely to the feed direction.

Correspondingly, the invention is related to a method of spatially positioning a band saw blade while a sawing material is guided against the band saw blade in a feed direction, in which a magnet force is exerted on the band saw blade, and the magnet force, and thereby the position of the band saw blade is adjusted transversely to the feed direction.

BACKGROUND OF THE INVENTION

Band saws mostly consist of two wheels arranged one above the other, sometimes also one besides the other, with a horizontal axis of rotation, over which a band saw blade is guided. One of the wheels is driven and, hence, moves the band saw blade in a longitudinal direction. Band saw blades are, for example, 10 m long and run with a velocity of about 30 to 45 m/s.

For making sure that the band saw blade runs stably, even if a sawing material, for example wood, is guided with a certain force with its front against a narrow, toothed side of the band saw blade, the band saw blade is mechanically held under tension with high forces. This is done by increasing the distance between the wheel axes after having applied the band saw blade upon the wheels.

Moreover, it is well known to push the band saw blade, which otherwise would run along a common tangent line interconnecting the wheels, in an outward direction by means of two mechanical guide elements arranged at a distance along the respective strand, such that the band saw blade extends parallel to the tangent line over a certain section. This results in that the free length of the band saw blade is reduced to the distance between the two guide elements, and that the band saw blade reacts with a higher resistance to a force acting laterally on it.

Band saw blades are exposed to different mechanical loads not only by such a bias but also by the sawing itself. These loads cause the band saw blade to evade. Depending on how the forces acting chaotically and irregularly on the band saw blade during sawing engage same, various evasion movements occur.

One first such evasion movement is directed opposite the feed movement. This evasion movement is conventionally countered by guiding the band saw blade over wheels being configured crowned at their periphery. The evasion movement is quite critical in view of the dimensional accuracy of the sawing operation and the quality of the surface generated during the sawing.

A second such evasion movement is directed laterally. This evasion movement is significantly more critical because it influences both the dimensional accuracy and the surface quality. In conventional band saws, this evasion movement, as already mentioned, is countered essentially only by a high tension of the band saw blade and by shortening the free length thereof.

Finally, it may happen that the band saw blade is twisted around its longitudinal axis.

All these evasive movements are disadvantageous in operation. On the one hand, they result in a stretching of the band saw blade and, on the other hand result in an increased wear. Furthermore, also the quality, i.e. the dimensional accuracy and the quality of the generated surface, i.e. the saw cut, are negatively affected when the band saw blade evades laterally during sawing or twists.

In order to keep such movements and deformations as small as possible, one has suggested various mechanical guides for the band saw blade. These guides are mostly configured as slide guides or as roller guides. These guides, however, have the disadvantage that they likewise cause wear due to friction.

For this reason one has already suggested a magnetic guide for a band saw blade.

Printed citation DE 201 05 845 U1 describes such a magnetic band saw positioning apparatus. This prior art apparatus essentially consists of a U-shaped guide, the legs of which extending on both sides of the band saw blade to be positioned. The guide as a whole is supported via springs against a machine-mounted bearing in the feed direction of the sawing material.

Two parallel rows each of opposing magnets, apparently permanent magnets, are integrated into the two legs of the guide, wherein the rows extend parallel to the longitudinal direction of the band saw blade. The one row is positioned besides the tooth base of the band saw blade teeth and the other row is positioned besides the rear edges of saw blade holes extending in a longitudinal direction. Nothing is said in the printed citation neither about the polarisation of the magnets nor their interaction with the band saw blade.

The legs of the guide are dimensioned so long and the guide is positioned relative to the band saw blade such that the rear side of the band saw blade keeps a distance to the flange interconnecting the legs. Thereby, with large feed forces, the band saw blade can be somewhat displaced in the feed direction against the action of the magnets, wherein also the resilient support finally has a limiting function.

The guide effects exclusively a support of the band saw blade opposite the feed direction, and, hence, only counteracts the not so critical evasive movements of the band saw blade in the feed direction. Lateral evasive movements and a twisting of the band saw blade are not prevented by the prior art guide which, therefore, does not contribute to the improvement of the saw cut quality with regard to dimensional accuracy and surface quality.

Printed citation SE 436 849 B describes a circular or band saw in which a force is exerted on the saw blade by means of two electromagnets positioned on opposite sides of the saw blade. By means of a sensor the lateral position of the saw blade is detected, is compared with a desired position, and the saw blade, as the case may be, is redirected into the desired position by corresponding excitation of the magnets. By doing so, a fluttering of the saw blade is prevented.

SUMMARY OF THE INVENTION

It is, therefore, an object underlying the invention, to improve a band saw as well as a method for positioning a saw blade of the type mentioned at the outset such that the aforementioned disadvantages are avoided. In particular, the invention shall make it possible to guide band saw blades in a contactless manner and precisely in their position, wherein, in particular, a lateral evasion and a twisting of the band saw blade are avoided or reduced to a no more disturbing extent.

In a band saw of the type mentioned at the outset, this object is achieved in that the guide, as viewed in the feed direction of the sawing material, has a front magnet and a rear magnet, the magnets facing a front area and a rear area, respectively, of the band saw blade.

In a method of the type mentioned at the outset, this object is achieved in that differently set magnet forces, as viewed in the feed direction of the sawing material, are exerted on a front area and on a rear area, respectively, of the band saw blade.

The object underlying the invention is, thus, entirely solved.

The specific type of the inventive control, namely, allows for the first time to laterally guide a band saw blade in a contactless manner. Thereby not only the wear on the band saw blade is minimized but also the quality of the executed saw cuts is optimized. Moreover, band velocities up to more than 100 m/s are achieved.

The measure, to excite the magnets with different magnet forces has the advantage that an oblique position and a twisting, respectively, of the band saw blade can be compensated for by an individual action on the front and on the rear area thereof. One, therefore, exerts a torque on the band saw blade which compensates the twisting. On the other hand, the option is open to intentionally twist the saw blade and, thus, to orient it obliquely relative to the feed direction of the sawing material, in order to make straight, but oblique or arc-shaped saw cuts. This is of particular advantage for a sawing material having a conical or an arc-shaped form as is the case with naturally grown logs.

In a preferred embodiment of the invention, the at least one magnet is an electromagnet.

This measure has the advantage that components may be used which are available as commercial products in the required dimensions and precision and at low cost.

Moreover, an embodiment of the inventive band saw is preferred in which the guide has sensors for detecting the position of the band saw blade in a direction transverse to the feed direction, the sensors being operatively connected with the magnets via a controller, and, preferably, a desired value for the position being adapted to be fed to the controller. Correspondingly, according to the method the position of the band saw blade is detected and is controlled on a desired value by the adjusting of an amount of the magnet force.

These measures have the advantage that a closed control loop is provided allowing a precise positioning of the band saw blade, thereby eliminating all occurring disturbance variables, among which are also thermal and other influences.

In a particularly preferred improvement of this embodiment which may likewise be used alone, i.e. without the other mentioned features, means for detecting a natural frequency of the band saw blade circulating in engagement and/or out of engagement with the sawing material are associated to the sensors, the means feeding control signals for compensating periodical movements of the band saw blade directed transversely to the feed direction to the at least one magnet in synchronism with the natural frequency. According to the method a natural frequency of the circulating band saw blade when in engagement and/or out of engagement with the sawing material is detected, the magnet force being adjusted for compensating periodical movements of the band saw blade directed transversely to the feed direction in synchronism with the natural frequency.

These measures have the advantage that an effective compensation of a substantial disturbance variable becomes possible, namely the natural resonance of the band saw. As all moving systems a band saw exhibits one or more such natural resonances with a fundamental frequency and harmonics. This natural resonance results in an oscillation of the band saw blade in a lateral direction, also as a torsional oscillation, at high frequencies. Within the scope of this embodiment, the frequencies of the fundamental and the harmonic waves are determined beforehand. The oscillation of the band saw blade is then extinguished by interference, in that an oscillating force of like frequency but opposite direction is exerted on the band saw blade.

Analogously one can proceed with still another phenomenon of band saws, namely the interference due to the circulating butt joint of the band saw blade. This butt joint interconnecting both ends of the band saw blade and being made by soldering or welding configures a discontinuity shaped as a bump which during each circulation generates an evasive movement when it runs over the guide. In the above-mentioned example of a band saw blade of 10 m length and a velocity of 40 m/s this event has a frequency of 4 Hz or a clock period of 250 ms. When the band saw velocity is 100 m/s, the frequency would be 10 Hz and the clock period 100 ms.

Within the scope of still another embodiment which may likewise be used alone, i.e. without the other mentioned features, means for detecting a periodical evasive movement of the circulating band saw blade caused by a butt joint running by the guide and being directed transversely to the feed direction are associated to the sensors according to the invention, the means feeding control signals for compensating such movements of the band saw blade to the at least one magnet in synchronism with the butt joint running by the guide. According to the method a periodical evasive movement of the circulating band saw blade caused by a butt joint running by the guide, and being directed transversely to the feed direction is detected, and the magnet force is adjusted for compensating such movements of the band saw blade in synchronism with the butt joint running by the guide.

This measure has the advantage that also these periodically occurring evasive movements can be effectively compensated for.

Within the scope of the present invention a good effect is achieved in that the guides, as viewed in the sawing direction of the band saw blade have a guide module in front of the sawing material and a guide module behind the sawing material. According to the method the magnet force, as viewed in a sawing direction of the band saw blade, is exerted on the band saw blade in front of and behind the sawing material.

This measure has the advantage that the band saw blade is stabilized within the sawing area.

In still other embodiments of the invention the magnets, as viewed transversely to the feed direction, are positioned on both sides of the band saw blade. According to the method the magnet force, as viewed transversely to the feed direction, is exerted on both sides of the band saw blade.

This measure has the advantage that the band saw blade may extend freely between the wheels along a tangent line common for both wheels. Accordingly, in the rest position of the band saw blade no basic force must be exerted from the magnets of the magnet guide on the band saw blade extending symmetrically between them. Further, the control speed in both directions is very high because it only depends on the rise rate of the magnet force, i.e. an electronically controllable value. By means of the magnets arranged on both sides of the band saw blade, the band saw blade may be specifically twisted about its longitudinal axis.

As an alternative, the magnets, as viewed transversely to the feed direction, may also be positioned only on one side of the band saw blade. According to the method, the magnet force, as viewed transversely to the feed direction, is exerted on one side of the band saw blade only.

If, when doing so, the band saw blade is guided over two wheels, several alternatives are possible.

In a first alternative, the guides extend beyond a common tangent line interconnecting the wheels.

This measure has the advantage that known and well-proven concepts for biasing a band saw blade by lateral deflection may be used.

In a second alternative, the guides extend inwardly beyond a common tangent line interconnecting the wheels.

This measure has the advantage that band saw assemblies of the type already mentioned may be put into practice in which two individual band saws may be positioned one adjacent the other.

According to another embodiment of the invention which may also be used alone without the other mentioned features, guides, as viewed transversely to the feed direction are positioned on one side of the band saw blade.

In that case it is preferred when mechanical guide blocks are provided on the opposite side of the band saw blade.

This measure has the advantage that the band saw blade in the event of a wilful shutoff or an unwanted failure of the magnet comes into a defined rest position in which it may run down to a standstill under tension and is still held after standstill. The desired deflection of the band saw blade in an inward or an outward direction is effected in that the inner or outer, respectively, magnet in a standard position of the band saw blade exerts a certain basic force on the band saw blade, the basic force being modulated, i.e. increased or decreased depending on the particular evasive movement.

In a third alternative, the guides extend along a common tangent line interconnecting the wheels and concurrently configure mechanical guides.

Further advantages will become apparent from the drawing and the enclosed description.

It will be understood that the features of the invention mentioned above and those yet to be explained below can be used not only in the respective combination indicated, but also in other combinations or in isolation, without leaving the scope of the present invention.

BRIEF DESCRIPTION OF THE DRAWINGS

Exemplary embodiments of the invention are explained in more detail in the following description and are represented in the drawings, in which.

DETAILED DESCRIPTION OF THE PREFERRED EMBODIMENTS

Figure 1:
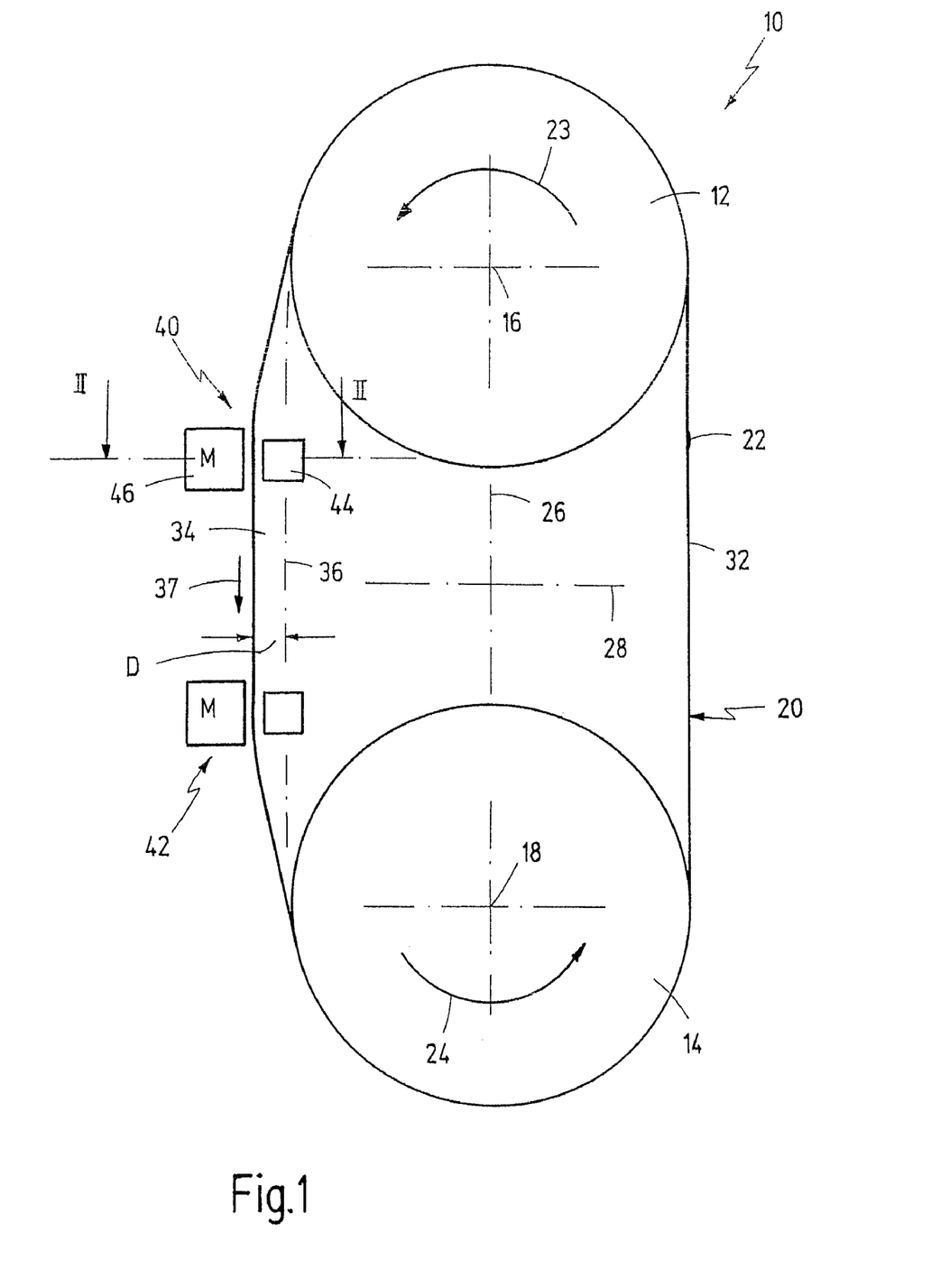
FIG. 1: is a highly schematical side elevational view of an embodiment of a band saw according to the invention with which the method of positioning a band saw blade according to the invention may be executed.

In FIG. 1, reference numeral 10 as a whole designates a band saw, as is typically used in saw mills for dissecting logs, for dissecting and edging boards and the like. Band saw 10 may be installed in the sawmill as an integrated stationary unit or as a mobile unit.

Band saw 10 comprises an upper wheel 12 and a lower wheel 14 rotating about a horizontal upper axis 16 and a lower axis 16, respectively. A band saw blade 20 is stretched over wheels 12 and 14. Band saw blade 20 is provided with teeth 21 on the front side of FIG. 1 (see FIG. 2).

The free ends of band saw blade 20 are interconnected with a butt joint 22 which may be generated by welding or soldering. With regard to band saw blade 20 butt joint 22 configures a discontinuity having the shape of a bump.

Arrows 23 and 24 indicate the sense of rotation of wheels 12 and 14. The positioning of wheels 12 and 14 with regard to a vertical axis 26 intersecting axes 16 and 18 and with regard to a horizontal axis 28 extending centrally between axes 16 and 18 is symmetrical.

In FIG. 1 the right hand strand of band saw blade 20 is designated with 32 and the left hand strand with 34. From the senses of rotation 23 and 24 of wheels 12 and 14 follows a running direction of band saw blade 20 in its left strand 34 being directed downwardly as indicated by an arrow 37. Whereas right strand 32 extends tangentially on the right hand side of wheels 12 and 14, left strand 34 keeps a distance D from a tangent line 36 on the left side of wheels 12 and 14. This is effected by an upper guide 40 as well as a lower guide 42. Guides 40 and 42 are positioned such that a sawing table is located therebetween (not shown) on which, for example, a wood board is pushed through band saw 10, namely in the illustration of FIG. 1 perpendicularly to the drawing plane.

Insofar, band saw 10 corresponds essentially to the prior art.

Figure 2:
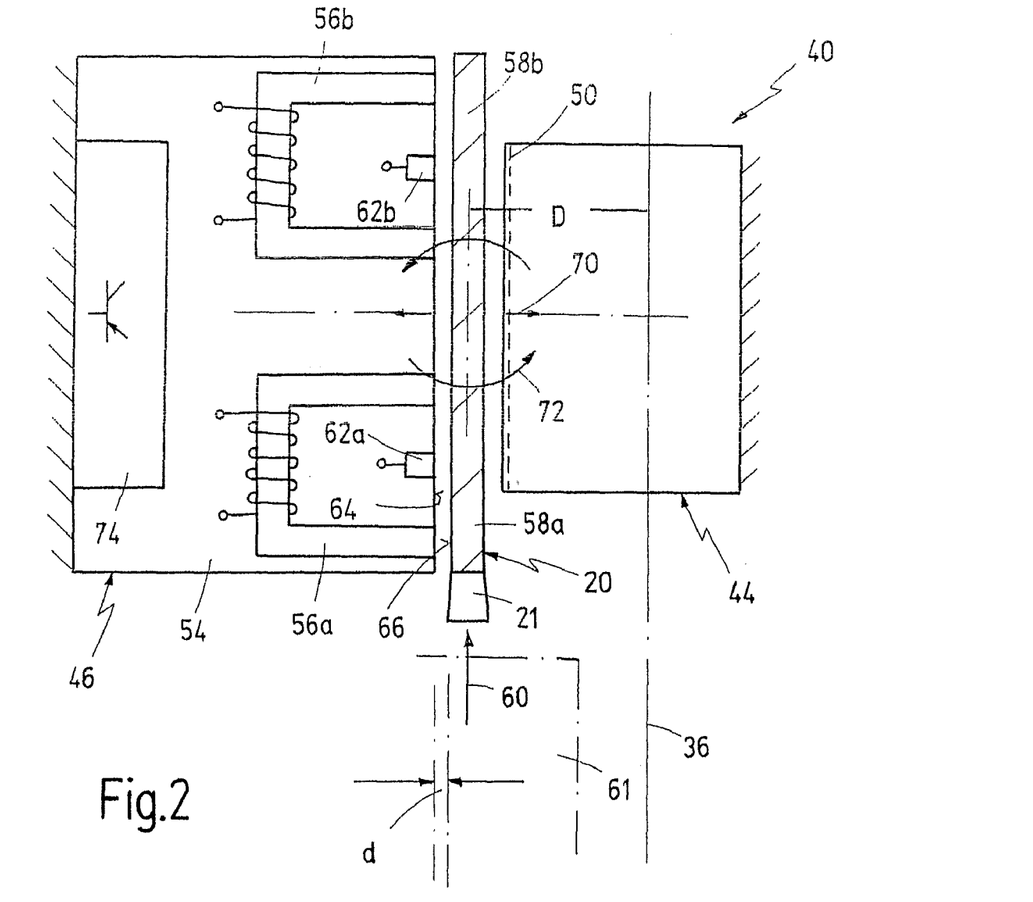
FIG. 2: on an enlarged scale shows a guide of the band saw of FIG. 1 in a view along line II-II.

FIG. 2, in a view from above, shows details of upper guide 40. Guide 40 on the right hand side of band saw blade 20 in FIG. 2 comprises a machine-mounted guide block 44 and on the left side a machine-mounted magnet guide 46. The arrangement right/left of guide block 44 and magnet guide 46 may, of course, also be the other way round. The term "machine-mounted" is to be understood to mean that during operation of band saw 10 elements 44 and 46 are rigidly connected with the machine base, however, may be adapted to be adjusted e.g. for calibration purposes. Machine-mounted guide block 44 may be provided with a low-friction coating 50.

Magnet guide 46 comprises a housing 54. Within housing 54 there are provided a front electromagnet 56a as well as a rear electromagnet 56b facing a front area 58a and a rear area 58b, respectively, of saw blade 20. The terms "front" and "rear" are related to a feed direction 60 of a sawing material indicated at 61, for example a wood board as already mentioned.

Electromagnets 56a and 56b are, preferably, of same design. The design with a U-shaped yoke indicated in FIG. 2 is, of course, only to be understood as an example. As a matter of principle, any component may be used in the present context allowing to exert an adjustable force on band saw blade 20 in a contactless manner.

As two electromagnets 56a and 56b are used in any of the two magnet guides 46, the entire assembly with two superimposed magnet guides (FIG. 1) has four such electromagnets.

A front sensor 62a is associated to front electromagnet 56a and a rear sensor 62b is associated to rear magnet 56b. Sensors 62a and 62b are adapted to detect a distance in a magnetic, capacitive, optical, acoustical or other manner. Within the magnetic guide 46 they measure a distance d between the right hand (FIG. 2) surface 64 of magnet guide 46 and the left hand (FIG. 2) surface 66 of band saw blade 22 in its front area 58a and its rear area 58b, respectively.

When electromagnets 56a and 56b are excited with the same current intensity, i.e. when they exert the same magnet force on areas 58a and 58b, then band saw blade 20, as viewed in FIG. 2, will be displaced to the left or to the right, as indicated by a double arrow 70 while maintaining its orientation. If, however, the magnet forces of electromagnets 56a and 56b are different, then band saw blade 20 is twisted about its longitudinal axis as indicated by a pair of arrows 72. By doing so it is possible to orient band saw blade 20 obliquely with regard to feed direction 60 of sawing material 61. One can then make oblique or arc-shaped sawing cuts within sawing material 61, in particular when sawing material 61 is conical or arc-shaped with regard to feed direction 60, as is the case for naturally grown logs or parts thereof.

Accordingly, by selectively energizing electromagnets 56a and 56b, one can as well compensate for lateral evasive movements as torsion of band saw blade 20, being appropriate when sawing material 61 is guided with high power against teeth 21 of band saw blade 20 in feed direction 60 and saw blade 20 then buckles, or when band saw blade 20 enters into inhomogeneous areas of sawing material 61, for example knots in a wood board.

The magnet force is preferably exerted as follows:

When band saw blade 20 is in its rest position, i.e. no magnet force is exerted, it rests on machine-mounted guide blocks 44, for example by a conventional mechanical setting of a certain laterally oriented biasing force of about 100 to 1,000 N, e.g. 600 N. Directly before or after the starting of band saw 10, band saw blade 20 is lifted off guide blocks 44 by a magnet force of e.g. 700 N being higher than the mechanical bias force of e.g. 600 N until it assumes a position between guide blocks 44 and magnet guides 46 as shown in FIGS. 1 and 2 (distance d). This may be done irrespective of band saw blade 20, as will be explained later, is twisted about its longitudinal axis or not. In this desired position band saw blade 20 is guided in a contactless manner. The position control is then effected around this desired magnet force of 700 N by modulation, e.g. by reducing or increasing the magnet force.

As an alternative it is, of course, also possible to manage without guide blocks 44 and to position magnet guides 46 on both sides of band saw blade 20 (not shown). In that case the control of the lateral position of the band saw blade would be effected through a selective excitation of magnet guides 46 on both sides of band saw blade 20. Band saw blade 20 would then extend along a common tangent line of both wheels 12 and 14 as shown in the right half of FIG. 1. In this embodiment eight magnets altogether would be used at right/left, up/down and front/rear positions.

Figure 3:
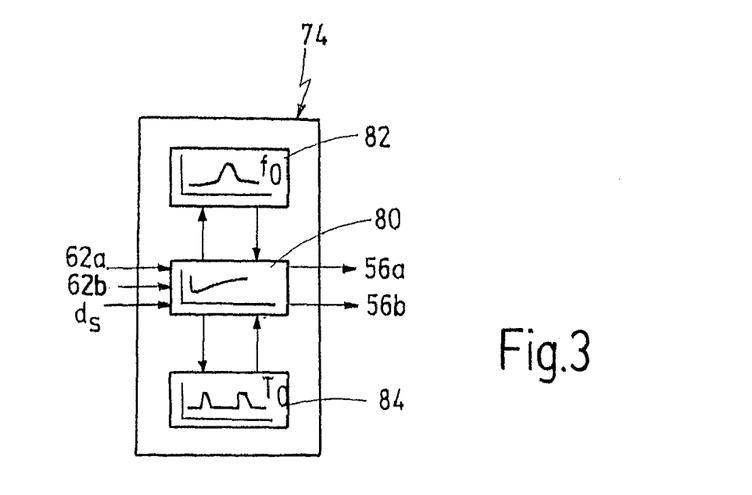
FIG. 3: shows a block diagram of an electronic control unit as may be used in the guide of FIG. 2.

FIG. 3 shows a block diagram of an electronic control unit 74 which may be used for energizing electromagnets 56a and 56b and, further provides still other functions.

Control unit 74 comprises a controller 80. Signals from sensors 62a and 62b as well as a desired value $d_s$ indicating the desired distance between surfaces 64 and 66 are fed to inputs of controller 80. From the actual values of distance d and from the given desired value $d_s$ controller 80 in a manner known per se generates correcting variables for energizing electromagnets 56a and 56b.

In embodiments of the invention which may also be used alone, a frequency analyzer 82 is, further, associated to controller 80. From e.g. the signals of sensors 62a and 62b frequency analyzer 82 continuously computes the natural frequency or, as the case may be, several natural frequencies $f_0$ of band saw 10 which, however, may also be given as fixed value or values, respectively, determined beforehand. Normally, one has different natural frequencies $f_0$ when the band saw blade 20 is out of engagement with the sawing material and in engagement therewith, respectively, when the tension of the band saw blade varies etc.

The natural frequency $f_0$ of band saw 10 becomes apparent as a periodical oscillation of band saw blade 20 which mostly is a superposition of lateral movements and torsional movements. These natural oscillations essentially depend on the free length of band saw blade 20 between wheels 12, and 14, on the tension force, on the modulus of elasticity of band saw blade 20, as well as on the system saw/sawing material at the prevailing operation parameters.

On the basis of a command variable supplied by frequency analyzer 82 controller 80 now generates a periodical correcting signal of even frequency but opposed polarity for electromagnets 56a and 56b, such that the natural oscillations of band saw blade 20 are extinguished through interference. One has found that this given control with frequency $f_0$ known beforehand is more effective than a control on the basis of measured instantaneous values. It goes without saying that while doing so, one may not only take into account the fundamental wave of the natural oscillation of the band saw blade but likewise harmonic waves.

In a similar manner, a clock 84, also associated to controller 80 acts in embodiments of the invention which may also be used alone. Clock 84 governs controller 80 with a command variable characterizing the periodical running by of butt joint 22 configuring an uneven discontinuity at magnet guide 40. If, for example, band saw blade 20 has a length of 10 m and is moved at a linear velocity of 40 m/s, then butt joint 22 runs by magnet guide 46 with a frequency of 4 Hz or a clock period of 250 ms. The running by effects an evasive movement which is compensated for by a correspondingly gated excitation of electromagnets 56a and 56b with a signal of sufficient amplitude and opposed polarity.

Here, too, the frequency and the clock period, respectively, may vary, for example when a high load acts on band saw blade 20 and, hence, its drive motor. For band saws, three-phase asynchronous motors are conventionally used as drives. Such motors, however, have a load-dependent slip, such that the rpm, and, hence, the velocity of band saw blade 20 may fluctuate by about 1 to 3%. Therefore, the clock period of the butt joint 22 running by is continuously detected such that a dynamic compensation is also possible here.

Figure 4:
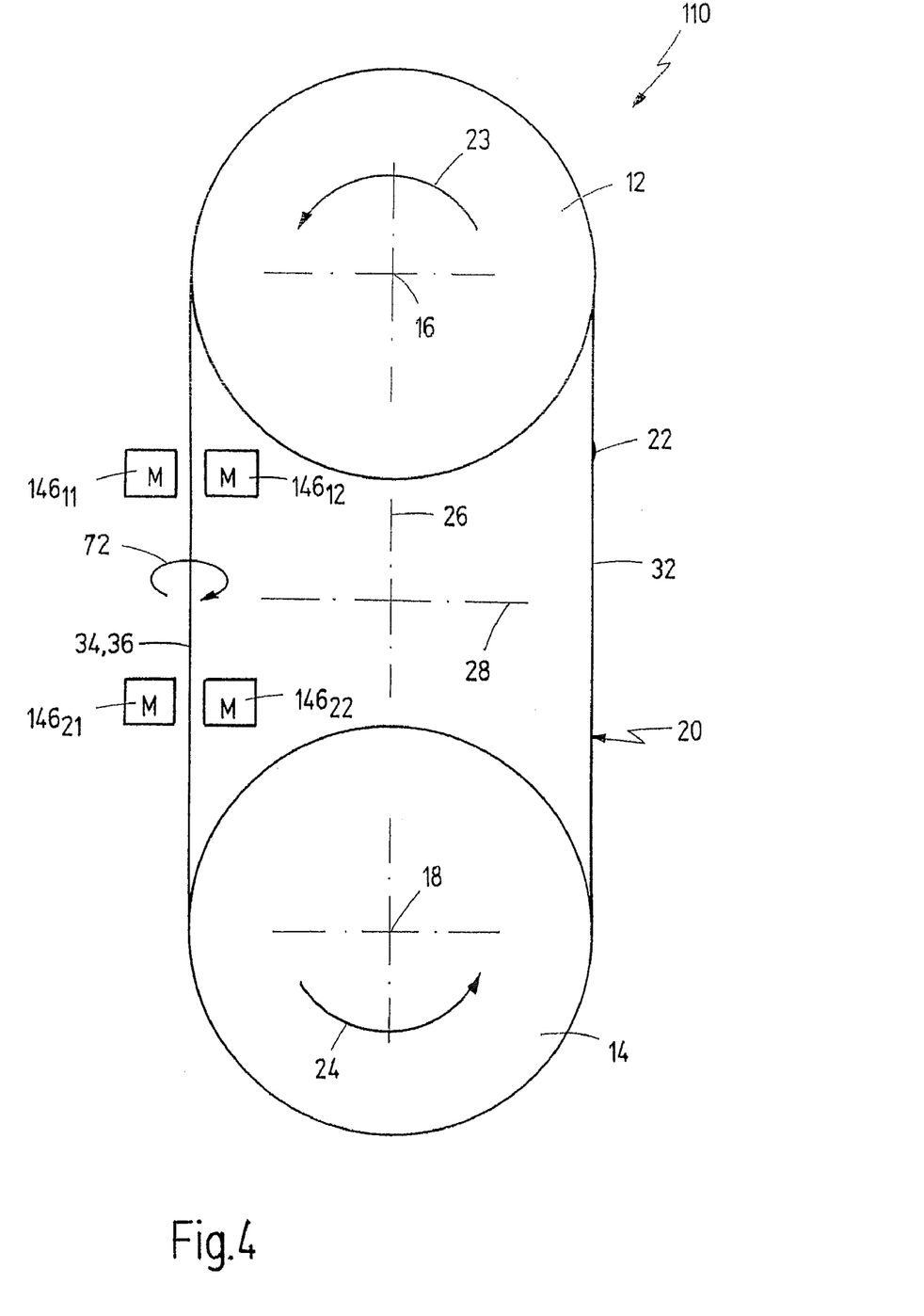
FIG. 4: is a view, similar to that of FIG. 1, however for another embodiment of a band saw according to the invention, in an operational mode, in which the alternatingly increasing load of the band saw blade is low and the velocity of the position control is high.
Figure 5:
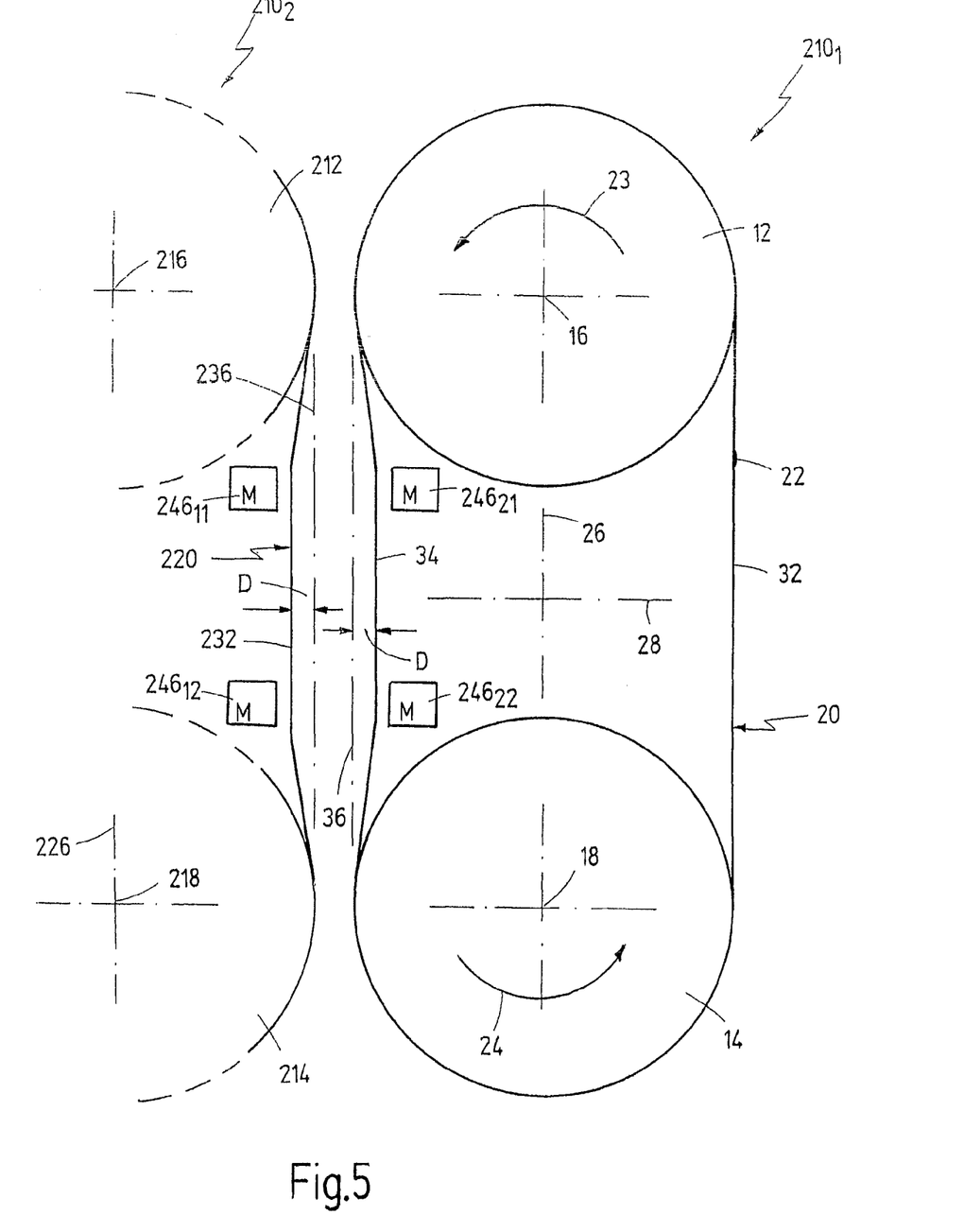
FIG. 5: is a view, similar to that of FIG. 1, but for still another embodiment of a band saw according to the invention, in which, preferably, two band saws are used one adjacent the other.
Figure 6:
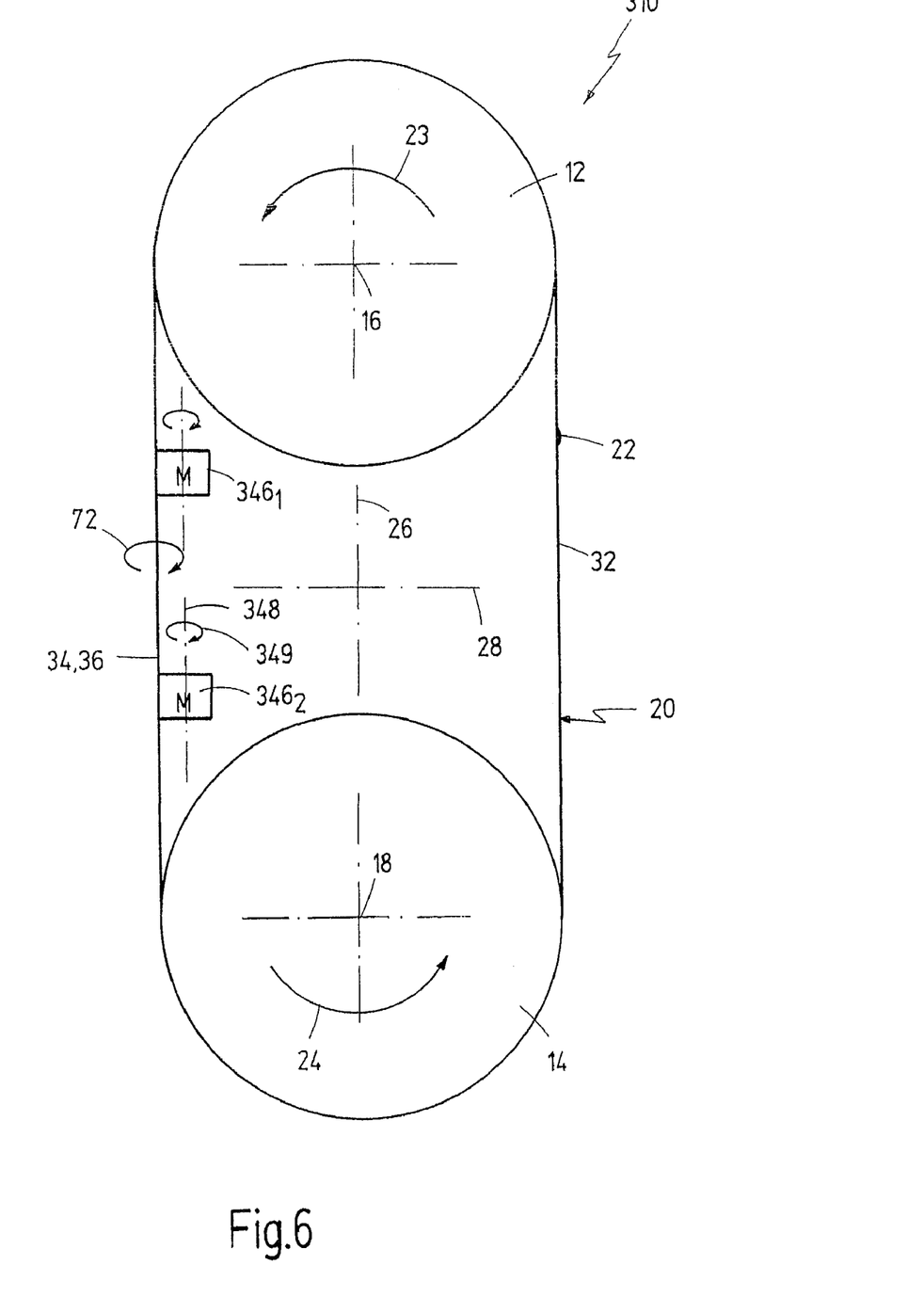
FIG. 6: is a view, similar to that of FIG. 1, however for still another embodiment of a band saw according to the invention, in which likewise the extent of alternatingly increasing loads is minimized.

In FIGS. 4 and 6 three more embodiments of band saws having a basic structure corresponding to that of band saw 10 of FIG. 1 are shown, irrespective of whether band saw blade 20 is twisted about its longitudinal axis. In FIGS. 4 to 6 like elements are designated bay like reference numerals.

In the embodiment of FIG. 4 a band saw 110 having four magnetic machine-mounted guides $146_{11}$, $146_{12}$, $146_{21}$, $146_{22}$ are shown being positioned as two pairs above each other in the area of left strand 34. The two guides of a pair are positioned on opposing sides of left strand 34. In the embodiment shown, the positioning is made such that left strand 34 coincides with tangent line 36 of the two wheels 12 and 14.

The guides $146_{11}$, $146_{12}$, $146_{21}$, $146_{22}$ in their design preferably correspond to the illustration of FIG. 2.

The positioning of guides $146_{11}$, $146_{12}$, $146_{21}$, $146_{22}$ on both sides along band saw blade extending along a tangent line touching wheels 12 and 14 has the effect that contrary to the embodiment of FIG. 1 no basic force must be exerted by magnets within guides $146_{11}$, $146_{12}$, $146_{21}$, $146_{22}$ on band saw blade 20 extending symmetrically between them in the rest position, i.e. when band saw blade 20 is not displaced.

Further, the lateral displacement of band saw blade 20 may be effected faster as is the case for the embodiment of FIG. 1 for the displacement to the right. For the two-sided positioning of guides $146_{11}$, $146_{12}$, $146_{21}$, $146_{22}$ the speed of displacement namely depends primarily on the electronic control of the magnets, i.e. the rise rate of the magnet force which may be set very high. In the embodiment of FIG. 1, however, the displacement to the right, i.e. away from the magnet of magnet guide 46 is effected solely under the influence of the mechanical spring constant of the system, in particular of band saw blade 20.

By this positioning, moreover, the above mentioned measure may be effected particularly well, namely to twist band saw blade about a vertical axis in the area between guides $146_{11}$, $146_{12}$, $146_{21}$, $146_{22}$ by a corresponding polarization of electromagnets 56a and 56b as indicated with arrow 72 in FIG. 2. The extent of the torsion is increased within the scope of elasticity of band saw blade 20 by positioning such electromagnets on opposite sides of band saw blade 20 according to FIG. 4. Should no sufficient torsion angle be achievable in view of, on the one hand, the width of a practically possible air gap between band saw blade 20 and guides $146_{11}$, $146_{12}$, $146_{21}$, $146_{22}$ and, on the other hand, the width of band saw blade 20 in the feed direction 60, then, according to the invention, one may configure guides $146_{11}$, $146_{12}$, $146_{21}$, $146_{22}$ adapted to be rotated about a vertical axis, as will be explained below together with FIG. 6.

If a sawing material 61 shall be sawn by band saw 10 which is not straight in the feed direction 60, one can effect by appropriate excitation of the electromagnets that band saw blade 20 makes a cut which does not extend parallel to feed direction 60, but may extend, for example, obliquely or arc-shaped.

In the embodiment of FIG. 5 a band saw assembly is provided which, besides a first band saw $210_1$ of the type described with FIG. 1 also comprises a second band saw $210_2$ being essentially identical in design with fist band saw $210_1$, however arranged mirror-symmetrically. Second band saw $210_2$ also comprises wheels 212 and 214 having axes 216 and 218 lying on a vertical axis 226 and a band saw blade 220 running thereover. Its right strand 232 runs in the vicinity of left strand 34 of first band saw 2101. Such paired arrangements of band saws $210_1$, $210_2$ are used to apply two parallel saw cuts to a sawing material running therethrough in one run. When doing so still another pair of band saws may be provided perpendicularly to the drawing plane of FIG. 5 so as to apply four such saw cuts in one run. Such tandem band saws are known to the person of ordinary skill, for example from U.S. Pat. No. 3,318,347 and, hence, need not to be explained in further detail here.

In order to achieve an arrangement being as compact as possible, wheels 12 and 14 or 212, 214 of the two band saws $210_1$ and $210_2$ in FIG. 5 are arranged near to each other. In order to nevertheless provide band saw blade 20 or 220, respectively, with a certain tension, strands 34 and 323 in the embodiment of FIG. 5 are each drawn inwardly by means of magnetic, machine-mounted guides $246_{11}$, $246_{12}$, $246_{21}$, $246_{22}$ towards their respective vertical axis 26 and 226, respectively, i.e. in the illustration of FIG. 5 strand 34 is drawn by distance D from tangent line 36 to the right, and strand 232 by distance D from a corresponding tangent line 236 to the left.

If one would double the embodiment of FIG. 1 into a tandem band saw of the type of FIG. 5 by folding same about a vertical axis, then a close lateral approximation of the two band saws 10 would not be possible because the two laterally projecting magnet guides 46 would stand in the way. Further, in the transitional area between the two band saws 10 one could only saw relatively wide boards. With the arrangement of FIG. 5, however, an can make saw cuts which, as compared to the embodiment of FIG. 1, could be somewhat more approximated, and could be somewhat less approximated as compared to the embodiment of FIG. 6 being still to be described.

It goes without saying that also for the embodiment of FIG. 5 mechanical guide blocks may be used on the side of band saw blade 20 opposite magnetic guides $246_{11}$, $246_{12}$, $246_{21}$, $246_{22}$ as was described in connection with FIG. 1 above.

FIG. 6, finally, shows another embodiment of a band saw 310 in which only two machine-mounted magnet guides $346_1$ and $346_2$ are provided. These magnet guides $346_1$ and $346_2$ are positioned such that their left surface (FIG. 6) is flush with tangent line 36. When guides $346_1$ and $346_2$ are activated, they draw left strand 34 against these surfaces, such that left strand 34 coincides with tangent line 36.

In order to be able to also make oblique or arc-shaped cuts, band saw blade 20 may be twisted in a manner already described several times (arrow 72). Considering, however, that guides $346_1$ and $346_2$ simultaneously guide mechanically, they must be rotated simultaneously as indicated in FIG. 6 with an axis 348 and an arrow 349.

The invention claimed is:

1. A method of controlling a spatial position of a band saw blade stretched between two wheels relative to a sawing material while the sawing material is guided in a feed direction against a strand of said band saw blade moving along a running direction between said two wheels, by sensing during a sawing operation the actual position of said strand of said band saw blade and exerting an adjustable first magnet force on said strand of said band saw blade, said strand of said band saw blade defining a longitudinal axis substantially perpendicular to said feed direction, said first magnet force being adjustable in response to said sensed actual position to adjust the position of said strand of said band saw blade transversely to said feed direction, wherein said first magnet force is exerted on said strand of said band saw blade so as to cause said band saw blade to twist about said longitudinal axis of said strand of said band saw blade.

2. The method of claim 1, wherein said strand of said band saw blade has a front area including a leading edge having cutting teeth formed thereon and a rear area rearward of said front area in the feed direction, and further
   wherein said magnet force is exerted on said strand of said band saw blade so that said front area moves transversely to said feed direction differently from said rear area.

3. The method of claim 2, wherein said front area of said strand of said band saw blade moves transversely in a first direction relative to said feed direction and said rear area of said strand of said band saw blade moves transversely relative to said feed direction in a second direction opposite to said first direction, and further wherein the amounts by which said front and rear areas move transversely are independently controllable.

4. The method of claim 1, wherein said first magnet force is exerted on said strand of said band saw blade immediately upstream of said sawing material relative to said running direction.

5. The method of claim 4, wherein a second magnet force is exerted on said front area and said rear area of said strand of said band saw blade immediately downstream of said sawing material relative to said running direction.

6. A method of controlling a spatial position and angular orientation of a band saw blade stretched between two wheels defining a common tangent line interconnecting said wheels while a sawing material is guided in a feed direction against a strand of said band saw blade moving along a running direction between said two wheels, said band saw blade having a front area including a leading edge having cutting teeth formed thereon and a rear area rearward of said front area in said feed direction and said strand of said band saw blade defining a longitudinal axis substantially parallel to said tangent line, the method comprising:
 sensing the actual position of said strand of said band saw blade during a sawing operation,
 exerting an adjustable magnet force on said strand of said band saw blade transversely to said feed direction in response to said sensed actual position to control the position of said strand of said band saw blade relative to said tangent line, and further
 exerting an adjustable differential magnet force on the front and rear areas, respectively, of said strand of said band saw blade in response to said sensed actual position to control the angular orientation of said strand of said band saw blade about said longitudinal axis.

7. The method of claim 6, wherein said adjustable magnet force is exerted by applying a first magnet force to said strand of said band saw blade immediately upstream of said sawing material relative to said running direction, and a second magnet force to said strand of said band saw blade immediately downstream of said sawing material relative to said running direction.

8. The method of claim 6, wherein said adjustable differential magnet force is exerted by applying a first magnet force on said front area of said strand of said band saw blade and a second magnet force on said rear area of said strand of said band saw blade, and further wherein said first magnet force is different from said second magnet force.

9. The method of claim 8, wherein said first and second magnet forces are exerted on said strand of said band saw blade immediately upstream of said sawing material relative to said running direction, and further
 wherein a third magnet force and a fourth magnet force different from said third magnet force are exerted on said front area and said rear area, respectively, of said strand of said band saw blade immediately downstream of said sawing material relative to said running direction.

10. The method of claim 9, wherein the magnitudes of said first, second, third and fourth magnet forces are independently controllable.

11. A method of controlling a spatial position of a band saw blade stretched between two wheels relative to a sawing material while the sawing material is guided in a feed direction against a strand of said band saw blade moving along a running direction between said two wheels, by sensing during a sawing operation the actual position of said strand of said band saw blade and exerting an adjustable magnet force on said strand of said band saw blade, said band saw blade having a front area including a leading edge having cutting teeth formed thereon and a rear area rearward of said front area in said feed direction, said magnet force being adjustable in response to said sensed actual position to adjust the position of said strand of said band saw blade transversely to said feed direction, wherein said magnet force comprises a first magnet force that is exerted primarily on said front area of said strand of said blade and a second magnet force exerted primarily on said rear area of said strand of said blade at a location that is spaced from said first magnet force in said feed direction, and further
 wherein said first magnet force is different from said second magnet force; and further wherein the magnitudes of said first and second magnet forces are independently controllable.

12. The method of claim 11, wherein said position of said strand of said band saw blade is detected and is controlled to a desired value by adjusting said magnet force.

13. The method of claim 11, wherein a natural frequency of said circulating band saw blade when in engagement and/or out of engagement with said sawing material is detected, said magnet force being adjusted for compensating periodical movements of said band saw blade directed transversely to said feed direction in synchronism with said natural frequency.

14. The method of claim 11, wherein said magnet force is created by a guide and further wherein a periodical evasive movement of said circulating band saw blade caused by a butt joint running by said guide, and being directed transversely to said feed direction, is detected, said magnet force being adjusted for compensating such movements of said band saw blade in synchronism with said butt joint running by said guide.

15. The method of claim 11, wherein said magnet force, as viewed transversely to said feed direction, is exerted on both sides of said band saw blade.

16. The method of claim 15, wherein said band saw blade is guided along a common tangent line interconnecting said two wheels.

17. The method of claim 11, wherein said magnet force, as viewed transversely to said feed direction, is exerted on one side of said band saw blade.

18. The method of claim 17, wherein said band saw blade is mechanically guided on an opposite side of said band saw blade.

19. The method of claim 18, wherein said band saw blade is mechanically guided over said two wheels and outside a common tangent line interconnecting said wheels.

20. The method of claim 18, wherein said band saw blade is mechanically guided over said two wheels and within a common tangent line interconnecting said wheels.

21. The method of claim 18, wherein said band saw blade is mechanically biased beyond said tangent line in absence of said magnet force.

22. The method of claim 17, wherein said band saw blade is mechanically guided over said two wheels and along a common tangent line interconnecting said wheels.

23. The method of claim 11, wherein said first and second magnet forces are exerted on said strand of said band saw blade immediately upstream of said sawing material relative to said running direction.

24. The method of claim 23, wherein third and fourth magnet forces are exerted on said front area and said rear area, respectively, of said strand of said band saw blade immediately downstream of said sawing material relative to said running direction.

* * * * *